(No Model.)
T. A. WEBER.
METHOD OF AND APPARATUS FOR MANUFACTURING CORK BOARD.
No. 524,747. Patented Aug. 21, 1894.
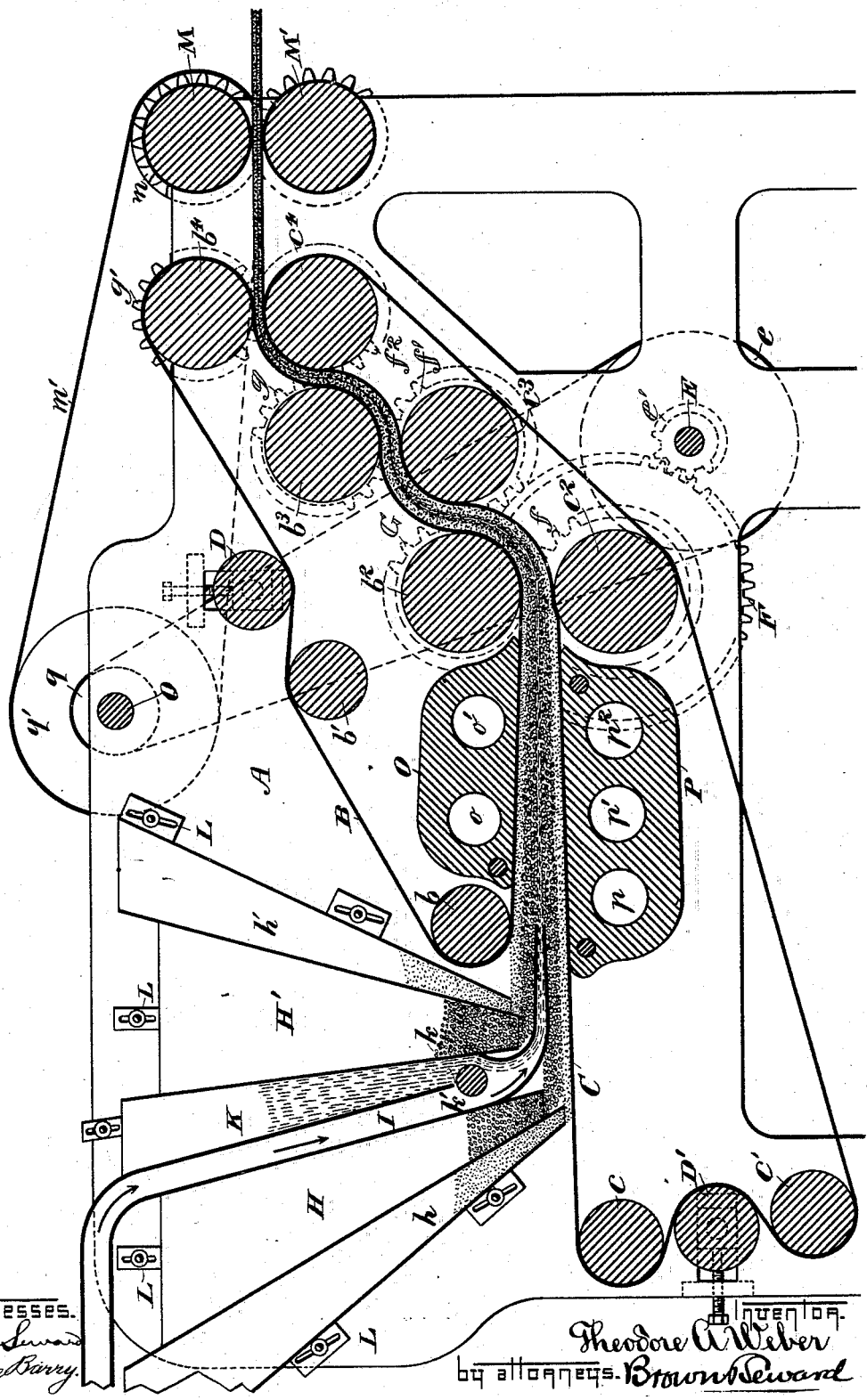

UNITED STATES PATENT OFFICE.

THEODORE A. WEBER, OF NEW YORK, N. Y., ASSIGNOR TO HORACE JONES AND FREDERICK W. EDDY, OF SAME PLACE.

METHOD OF AND APPARATUS FOR MANUFACTURING CORK-BOARD.

SPECIFICATION forming part of Letters Patent No. 524,747, dated August 21, 1894.

Application filed November 20, 1893. Serial No. 491,389. (No model.)

*To all whom it may concern:*

Be it known that I, THEODORE A. WEBER, of New York, in the county and State of New York, have invented a new and useful Improvement in Methods of and Apparatus for Manufacturing Cork-Board, of which the following is a specification.

My invention relates to an improvement in the method of and apparatus for manufacturing cork-board in which granulated cork intermingled with loose fibers is compressed into a compact, tough, flexible board or sheet.

My invention consists in introducing loose fibers among mingled granules of cork and subsequently compressing the cork granules and fiber into a compact mass and my invention further consists in apparatus for carrying the above recited method into practical effect.

The accompanying drawing represents in vertical, longitudinal section an apparatus for manufacturing the cork-board.

The supporting frame is conveniently formed in two similar side frames, the one farthest from the observer being denoted by A and the similar one toward the observer not being shown. Between the side frames a series of upper and lower compression rollers is journaled and also suitable guide rollers for directing a pair of endless belts in such a manner as to form a conduit between their adjacent faces for the admission, passage and compression of the cork granules and fiber, the said passageway gradually diminishing in thickness from beginning to end. The upper endless belt is denoted by B and the lower endless belt by C. The guide rollers at the end of the upper belt nearest the feed hoppers are denoted by $b$, $b'$ and the compression rollers under and partially around which the belt B extends, are denoted by $b^2$, $b^3$ and $b^4$. The guide rollers for determining the position of the lower belt at a point in front of the mouth of the feed hoppers are denoted by $c$, $c'$ and the compression rollers over and partially around which the lower belt extends and which coact with the compression rollers engaged with the upper belt, are denoted by $c^2$, $c^3$ and $c^4$.

An adjustable belt tightening roller D is provided for tightening the upper belt B and a similar belt tightening roller D' is provided for tightening the lower belt C. A shaft E is journaled to the side frames A and provided with a band pulley $e$ driven from a pulley $q$, on a shaft Q. The shaft E carries a pinion $e'$ which gears with a larger gear wheel F, fixed to rotate with the roller $c^2$; and there is also a gear wheel $f$, fixed to rotate with said roller $c^2$, which intermeshes with a gear wheel G, fixed to rotate with the roller $b^2$; and this in turn intermeshes with a gear wheel $f'$ fixed to rotate with the roller $c^3$; and this in turn intermeshes with a gear wheel $g$, fixed to rotate with the roller $b^3$; and this in turn intermeshes with a gear wheel $f^2$, fixed to rotate with the roller $c^4$; and this in turn intermeshes with a gear wheel $g'$, fixed to rotate with the roller $b^4$.

As a matter of economy in construction and at the same time providing for the same rate of travel of the curved surfaces of the several compression rollers and bringing those rollers located opposite each other upon opposite sides of the passage for the material, nearer together as the material advances along the passageway, I find it expedient to gradually decrease the number of gear teeth fixed to rotate with each succeeding roller and to make a corresponding decrease in the circumference of the roller.

I find it desirable to feed the cork granules into the conduit between the belts in layers composed of granules of varying sizes and for this purpose I employ a plurality of hoppers so arranged that the coarser granules of cork may be distributed within the central portion of the mass that is to form the completed board and the finer granules in a layer along the surfaces or surface of such mass. In the present instance I have shown a group of four hoppers, the two central hoppers for feeding the coarser granules and the outer hoppers for feeding the finer granules. The hoppers for feeding the coarse granules are denoted by H and H' and those for feeding the finer granules are denoted by $h$ and $h'$. Intermediate of the hoppers H and H' I locate a blast tube I for the purpose of blowing loose fibers into and among the cork granules, the blast being the means which I at present prefer to use for introducing the fibers. The particular nature of the blast which I prefer to use is a hot air blast from a suitable supply, not shown. The discharge mouth of the blast tube is located in such position with relation to the hoppers for discharging the granulated cork that the fibers will be discharged at the central portion of the mass. The hopper K for supplying the loose fiber, which may be cotton or wool fiber or any other well known or suitable fiber, is located intermediate of the hoppers H and H' and has a connection $k$ with the interior of the blast tube I. For the purpose of positively advancing the loose fiber from the hopper K into the blast tube, I mount the feed roller $k'$ in position to engage the loose fiber in the hopper K and urge it forward into the blast tube. The roller $k'$ is driven by means of a suitable belt from a drive shaft, not shown.

The hoppers for feeding the cork granules are made adjustable toward and away from the lower belt to regulate the amount of cork to be fed. The particular means of adjustment which I have employed is that of a slot and set screw, shown at L.

I find it desirable to treat either the fiber or the cork granules with some adhesive material, such for example as a solution of amber, and if, from any cause, the cork granules should fail to feed as freely as desired, I accelerate the feed by the introduction of a feed roller in the wall of the hopper quite similar to the feed roller hereinabove particularly referred to.

For the purpose of providing the board with a hard and glossy surface, I provide a pair of polishing or surfacing rollers M and M', geared together and located in position to receive the board after it passes from between the final compression rollers. The polishing or surfacing rollers are driven at a higher rate of speed than the board is fed so as to produce a rubbing action on the surface. I drive them by means of a pulley $m$ fixed to rotate with one of the rollers and connected by a band $m'$ with a suitable drive pulley $q'$ on the shaft Q.

Heaters O and P are located, the former above and the latter below the adjacent surfaces of the endless belts in front of the compression rollers for regulating the amount of heat which shall be found desirable for softening any adhesive matter with which the cork granules may have been treated and rendering them capable of being more readily compressed into a fixed thin sheet. The upper heater O is pivoted to the frame at one end and is permitted to rest with its lower flat surface on the upper belt, heating chambers $o\ o'$ being provided within the heater for supplying the heating medium, as for example steam. The lower heater P is secured to the frame with its upper flat surface engaged with the lower belt and it is provided with one or more—in the present instance three— chambers $p, p'$ and $p^2$ for the reception of the heating medium, which may be steam.

The operation is as follows:—The endless belts having been set in motion, the cork granules are fed from the hoppers in suitable quantities and the hot air blast is set in operation, blowing the fibers from the discharge end of the blast tube into the mass of cork granules and at the same time producing sufficient heat to soften any adhesive material with which the fibers or cork granules may have been treated. The mass is carried along between the heaters and gradually brought into a more compact form until it reaches the compression rollers where step by step it is further compressed until it finally issues from between the compression rollers $b^4$ and $c^4$ in a compact tough flexible sheet of the desired thickness and then passes on between the surfacing rollers to receive its hardened and polished surface.

It is obvious that the number of hoppers for distributing the cork granules may be increased or diminished at pleasure and that the number of compression rollers may be increased or diminished and that other slight changes might be resorted to in the form and arrangement of the several parts without departing from the spirit and scope of my invention.

What I claim is—

1. The method of manufacturing corkboard, consisting in introducing layers of granulated cork between continuously moving walls of a conduit, simultaneously therewith introducing loose fibers among the cork granules and subsequently compressing the layers of cork and the fibers into a compact sheet or board.

2. The method of manufacturing corkboards, consisting in feeding layers of granulated cork between continuously moving walls of a conduit, simultaneously therewith blowing loose fibers among the cork granules and subsequently compressing the layers of cork and the fibers into a compact sheet or board.

3. The method of manufacturing corkboard, consisting in introducing layers of granulated cork between the continuously moving walls of a conduit, blowing loose treated fibers among the cork granules as they are fed, submitting the commingled cork and granules to heat and subsequently gradually compressing the mass into a compact sheet or board.

4. The apparatus for manufacturing corkboard, comprising endless belts forming a conduit between their adjacent faces, compression rollers engaged with the belts, hoppers for delivering granulated cork between the belts and a fiber discharging tube having its mouth in proximity to the discharge ends of the hopper, substantially as set forth.

5. The apparatus for manufacturing corkboard, comprising endless belts forming a conduit between their adjacent faces, compression rollers engaged with the belts, hoppers for discharging granulated cork between the belts, a hopper for supplying loose fibers and a blast tube having its discharge mouth in proximity to the discharge ends of the cork supplying hoppers and communicating with the hopper for supplying loose fibers, substantially as set forth.

THEODORE A. WEBER.

Witnesses:
FREDK. HAYNES,
IRENE B. DECKER.